(12) United States Patent
Shiraishi

(10) Patent No.: US 11,163,145 B2
(45) Date of Patent: Nov. 2, 2021

(54) OBSERVATION DEVICE, OBSERVATION METHOD, AND OBSERVATION DEVICE CONTROL PROGRAM

(71) Applicant: FUJIFILM Corporation, Tokyo (JP)

(72) Inventor: Yasushi Shiraishi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 329 days.

(21) Appl. No.: 16/355,958

(22) Filed: Mar. 18, 2019

(65) Prior Publication Data

US 2019/0212539 A1 Jul. 11, 2019

Related U.S. Application Data

(63) Continuation of application No. PCT/JP2017/032930, filed on Sep. 12, 2017.

(30) Foreign Application Priority Data

Sep. 28, 2016 (JP) .............................. JP2016-189794

(51) Int. Cl.
*G02B 21/00* (2006.01)
*G02B 21/26* (2006.01)
(Continued)

(52) U.S. Cl.
CPC .............. *G02B 21/26* (2013.01); *G02B 7/28* (2013.01); *G02B 7/285* (2013.01); *G02B 21/14* (2013.01); *G02B 21/245* (2013.01)

(58) Field of Classification Search
CPC .. G02B 21/00; G02B 21/0016; G02B 21/002; G02B 21/0024; G02B 21/0036;
(Continued)

(56) References Cited

U.S. PATENT DOCUMENTS 10,761,295 B2\* 9/2020 Wakui ..................... G06T 7/337
2003/0184855 A1 10/2003 Yasuda et al.
(Continued)

FOREIGN PATENT DOCUMENTS

EP 2402811 A2 1/2012
JP 10232342 A 9/1998
(Continued)

OTHER PUBLICATIONS

Communication dated Feb. 10, 2020, issued by the Korean Intellectual Property Office in Korean Application No. 10-2019-7008483.
(Continued)

*Primary Examiner* — Thong Q Nguyen
(74) *Attorney, Agent, or Firm* — Sughrue Mion, PLLC

(57) ABSTRACT

Before an observation region of an imaging optical system (14) reaches an observation position in the cultivation container (50), a vertical position of the cultivation container (50) at the observation position is precedently detected by an auto-focus displacement sensor. In a case where an objective lens is moved in an optical axis direction on the basis of the position, an error between the precedently detected vertical position of the stage (51) at the observation position and a vertical position of the stage (51) at a time point when the observation region of the imaging optical system (14) is scanned up to the observation position is acquired, and the objective lens is moved in the optical axis direction on the basis of the error.

26 Claims, 8 Drawing Sheets

(51) Int. Cl.
*G02B 7/28* (2021.01)
*G02B 21/14* (2006.01)
*G02B 21/24* (2006.01)

(58) Field of Classification Search
CPC .......... G02B 21/0052; G02B 21/006; G02B 21/008; G02B 21/24; G02B 21/241; G02B 21/244; G02B 21/245; G02B 21/26; G02B 7/28; G02B 7/285
USPC .................. 359/368, 383, 391–393
See application file for complete search history.

(56) References Cited

U.S. PATENT DOCUMENTS

| | | | | |
|---|---|---|---|---|
| 2006/0045388 | A1* | 3/2006 | Zeineh | G02B 21/367 382/312 |
| 2011/0091125 | A1* | 4/2011 | Kenny | G06T 11/00 382/254 |
| 2012/0194729 | A1* | 8/2012 | Zahniser | G02B 21/244 348/345 |
| 2014/0168403 | A1* | 6/2014 | Winterot | G02B 21/26 348/79 |
| 2014/0204196 | A1* | 7/2014 | Loney | G02B 21/244 348/80 |
| 2016/0291306 | A1* | 10/2016 | Fukuda | G02B 21/244 |
| 2020/0257077 | A1* | 8/2020 | Shiraishi | G02B 21/14 |

FOREIGN PATENT DOCUMENTS

| | | |
|---|---|---|
| JP | 2003294419 A | 10/2003 |
| JP | 2003295065 A | 10/2003 |
| JP | 2007218846 A | 8/2007 |
| JP | 2010072017 A | 4/2010 |

OTHER PUBLICATIONS

Communication dated Nov. 20, 2020 by the Korean Patent Office in application No. 10-2019-7008483.
Communication dated Sep. 20, 2019 from the European Patent Office in application No. 17855713.8.
International Search Report dated Dec. 12, 2017 from the International Searching Authority in counterpart International Application No. PCT/JP2017/032930.
International Preliminary Report on Patentability dated Apr. 2, 2019 from the International Bureau counterpart with International Application No. PCT/JP2017/032930.
Written Opinion dated Dec. 12, 2017 from the International Bureau in counterpart International Application No. PCT/JP2017/032930.
Communication dated Mar. 4, 2021, issued by the European Patent Office in counterpart European Application No. 17855713.8.

* cited by examiner

OBSERVATION DEVICE, OBSERVATION METHOD, AND OBSERVATION DEVICE CONTROL PROGRAM

CROSS-REFERENCE TO RELATED APPLICATIONS

This application is a Continuation of PCT International Application No. PCT/JP2017/032930 filed on Sep. 12, 2017, which claims priority under 35 U.S.C § 119(a) to Japanese Patent Application No. 2016-189794 filed on Sep. 28, 2016. Each of the above application(s) is hereby expressly incorporated by reference, in its entirety, into the present application.

BACKGROUND OF THE INVENTION

1. Field of the Invention

The present invention relates to an observation device, an observation method, and a non-transitory computer readable recording medium storing an observation device control program for observing an entire image of an observation target by moving a stage on which a container in which the observation target is contained is placed with respect to an imaging optical system that forms an image of the observation target.

2. Description of the Related Art

In the related art, a method for capturing an image of a multipotential stem cell such as an embryonic stem (ES) cell or an induced pluripotent stem (iPS) cell, a differentiated and induced cell, or the like using a microscope or the like, and capturing a feature of the image to decide a differentiation state of the cell, or the like has been proposed.

The multipotential stem cell such as an ES cell or an iPS cell is able to be differentiated into cells of various tissues, and may be applied to regenerative medicine, development of medicines, explanation of diseases, or the like.

On the other hand, in a case where a cell is imaged using a microscope as described above, in order to acquire a high-magnification wide view image, for example, a so-called tiling imaging technique for scanning the inside of a range of a cultivation container such as a well plate using an imaging optical system and capturing an image for each observation position, and then, combining the images at the respective observation positions has been proposed.

JP2010-072017A discloses a method for precedently detecting, before an observation region of an imaging optical system reaches an observation position, a position of a well plate using a displacement gauge and moving an objective lens in an optical axis direction to perform an auto-focus control before the observation region reaches the observation position, in order to shorten an imaging time.

SUMMARY OF THE INVENTION

Here, in a case where the image for each observation position is captured as described above, there are many cases where a focal position of the imaging optical system is adjusted on a bottom surface of the cultivation container. However, the thickness of a bottom portion of the cultivation container has a millimeter-order fabrication tolerance, and thus, in a case where high-magnification imaging is performed, it is necessary to adjust the focal position for each observation position. On the other hand, it is desirable that a cell imaging time is short, and thus, it is desirable to provide a device capable of performing high-speed imaging.

However, in a related-art auto-focus control method, about 2 seconds are necessary for each observation position, and for example, in a case where the number of observation positions is 300, it takes 10 minutes only for a time necessary for an auto-focus control, which makes it impossible to perform high-speed imaging.

Further, as disclosed by JP2010-072017A, in a case where the Z-directional position of the XY stage at a time point when the Z-directional position of the well plate is detected by the displacement meter and the Z-directional position of the XY stage at a time point when the detected position in the displacement meter is moved to the position of the objective lens are different from each other, it is not possible to perform an appropriate auto-focus control due to an error of the Z-directional position of the XY stage, which results in an out-of-focus image.

In consideration of the above-mentioned problems, an object of the present invention is to provide an observation device, an observation method, and a non-transitory computer readable recording medium storing an observation device control program capable of performing an auto-focus control with high accuracy, without being affected by a vertical position change based on movement of a stage.

According to an aspect of the invention, there is provided an observation device comprising: a stage on which a container in which an observation target is contained is placed; an imaging optical system that includes an objective lens for forming an image of the observation target in the container; an imaging optical system driving section that moves the objective lens in an optical axis direction; a horizontal driving section that moves the stage in a horizontal plane; a scanning controller that controls the horizontal driving section to move the stage in a main scanning direction in the horizontal plane and in a direction orthogonal to the main scanning direction, to scan each observation position in the container in an observation region of the imaging optical system; a detection section that includes at an auto-focus displacement sensor that precedently detects a vertical position of the container at the observation position before the observation region reaches the observation position in the container, through scanning in the main scanning direction in the observation region of the imaging optical system; an imaging optical system controller that controls an operation of the imaging optical system driving section when the observation position is scanned in the observation region of the imaging optical system, on the basis of the vertical position of the container detected by the detection section; and a vertical direction error acquisition section that acquires an error between a vertical position of the stage at a time point when the vertical position of the container is precedently detected at the observation position by the auto-focus displacement sensor and a vertical position of the stage at a time point when the observation region of the imaging optical system is scanned up to the observation position, in which the imaging optical system controller controls the operation of the imaging optical system driving section to move the objective lens in the optical axis direction on the basis of the vertical position of the container in the observation position that is precedently detected by the auto-focus displacement sensor and the error acquired by the vertical direction error acquisition section, in scanning the observation position in the observation region of the imaging optical system.

In the observation device according to this aspect of the invention, the horizontal driving section may move the stage in a sub-scanning direction orthogonal to the main scanning direction while reciprocally moving the stage in the main scanning direction, and the vertical direction error acquisition section may acquire different errors between a case where the stage is moved forward and a case where the stage is reversely moved.

In the observation device according to this aspect of the invention, the detection section may include at least two auto-focus displacement sensors that are provided in parallel in the main scanning direction with the objective lens being interposed therebetween, and the vertical direction error acquisition section may acquire the vertical position of the stage at a scanning position in the observation region of the imaging optical system, on the basis of vertical positions of the stage detected by the two auto-focus displacement sensors.

The observation device according to this aspect of the invention may further comprise: two first stage position measurement displacement sensors that are provided in parallel in the sub-scanning direction with the auto-focus displacement sensor being interposed therebetween at the same position as the position of the auto-focus displacement sensor in the main scanning direction, and the vertical direction error acquisition section may acquire the vertical position of the stage at the position of the auto-focus displacement sensor, on the basis of vertical positions of the stage detected by the two first stage position measurement displacement sensors.

The observation device according to this aspect of the invention may further comprise: two second stage position measurement displacement sensors that are provided in parallel in the sub-scanning direction with the imaging optical system being interposed therebetween at the same position as the position of the imaging optical system in the main scanning direction, and the vertical direction error acquisition section may acquire the vertical position of the stage at a scanning position in the observation region of the imaging optical system, on the basis of vertical positions of the stage detected by the two second stage position measurement displacement sensors.

In the observation device according to this aspect of the invention, the vertical direction error acquisition section may include a table in which each observation position in the container and the error at each observation position are associated with each other.

In the observation device according to this aspect of the invention, the table may be updated at an interval of a predetermined time.

In the observation device according to this aspect of the invention, the imaging optical system driving section may include a piezoelectric element, and may move the objective lens in the optical axis direction using the piezoelectric element.

In the observation device according to this aspect of the invention, the auto-focus displacement sensor may be a laser displacement sensor.

According to another aspect of the invention, there is provide an observation method for moving a stage on which a container in which an observation target is contained is placed in a main scanning direction and in a sub-scanning direction that is orthogonal to the main scanning direction with respect to an imaging optical system including an objective lens for forming an image of the observation target in the container, to scan each observation position in the container in each observation region of the imaging optical system, precedently detecting a vertical position of the container at the observation position by an auto-focus displacement sensor before the observation region reaches the observation position in the container, through scanning in the main scanning direction in the observation region of the imaging optical system, and controlling movement of the objective lens in an optical axis direction when the observation position is scanned in the observation region of the imaging optical system, on the basis of the detected vertical position of the container, the method comprising: acquiring an error between a vertical position of the stage at the observation position that is precedently detected by the auto-focus displacement sensor and a vertical position of the stage at a time point when the observation region of the imaging optical system is scanned up to the observation position; and moving the objective lens in the optical axis direction, on the basis of the acquired error, and the vertical position of the container in the observation position that is precedently detected by the auto-focus displacement sensor in scanning the observation position in the observation region of the imaging optical system.

According to still another aspect of the invention, there is provided a non-transitory computer readable recording medium storing an observation device control program that causes a computer to execute: a step of moving a stage on which a container in which an observation target is contained is placed in a main scanning direction and in a sub-scanning direction that is orthogonal to the main scanning direction with respect to an imaging optical system including an objective lens for forming an image of the observation target in the container, to scan each observation position in the container in an observation region of the imaging optical system; a step of detecting a vertical position of the container at the observation position by an auto-focus displacement sensor before the observation region reaches the observation position in the container, through scanning in the main scanning direction in the observation region of the imaging optical system; a step of controlling movement of the objective lens in an optical axis direction when the observation position is scanned in the observation region of the imaging optical system, on the basis of the detected vertical position of the container; a step of acquiring an error between a vertical position of the stage at the observation position detected by the auto-focus displacement sensor and a vertical position of the stage at a time point when the observation region of the imaging optical system is scanned up to the observation position; and a step of moving the objective lens in the optical axis direction, on the basis of the acquired error, and the vertical position of the container in the observation position that is precedently detected by the auto-focus displacement sensor in scanning the observation position in the observation region of the imaging optical system.

According to the observation device, the observation method, and the non-transitory computer readable recording medium storing an observation device control program of the invention, before an observation region of an imaging optical system reaches an observation position in a container, a vertical position of the container at the observation position is precedently detected using an auto-focus displacement sensor. In a case where an objective lens of the imaging optical system is moved in an optical axis direction on the basis of the detected vertical position of the container, an error between a vertical position of a stage at the observation position precedently detected by the auto-focus displacement sensor, and a vertical position of the stage at a time point when the observation region of the imaging optical system is scanned up to the observation position is acquired, and the observation position is scanned by the observation region of the imaging optical system. Further, the objective lens is moved in the optical axis direction on the basis of the acquired error and the vertical position of the container at the observation position that is detected by the auto-focus displacement sensor, in scanning the observation position in the observation region of the imaging optical system. Thus, it is possible to perform an auto-focus control with high accuracy, without being affected by a vertical position change due to stage movement.

DESCRIPTION OF THE PREFERRED EMBODIMENTS

Figure 1:
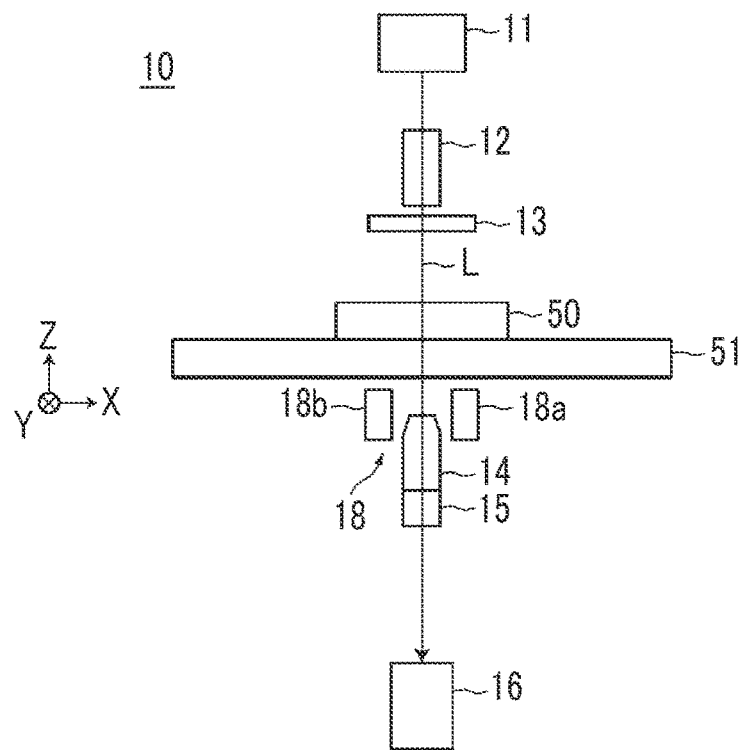
FIG. 1 is a diagram showing a schematic configuration of a microscope observation system that uses an observation device according to an embodiment of the present invention.

Hereinafter, a microscope observation system that uses an observation device, an observation method, and an observation device control program according to an embodiment of the invention will be described in detail with reference to the accompanying drawings. FIG. 1 is a block diagram showing a schematic configuration of a microscope device 10 in a microscope observation system of the embodiment.

The microscope device 10 captures a phase difference image of a cultivated cell that is an observation target. Specifically, the microscope device 10 includes a white light source 11 that emits white light, a condenser lens 12, a slit plate 13, an imaging optical system 14, an imaging optical system driving section 15, an imaging element 16, and a detection section 18, as shown in FIG. 1.

Figure 2:
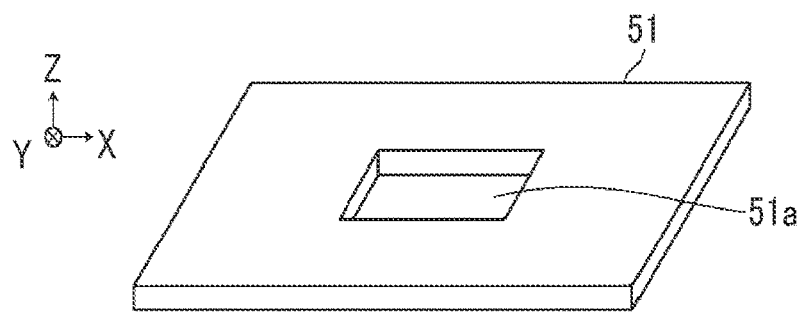
FIG. 2 is a perspective view showing a configuration of a stage.

Further, a stage 51 is provided between the slit plate 13, and the imaging optical system 14 and the detection section 18. A cultivation container 50 in which cells that are observation targets are contained is placed on the stage 51. FIG. 2 is a diagram showing an example of the stage 51. At the center of the stage 51, a rectangular opening 51a is formed. The cultivation container 50 is provided on a member that is formed with the opening 51a, and in this configuration, a phase difference image of a cell in the cultivation container 50 passes through the opening 51a.

As the cultivation container 50, a schale, a dish, a well plate, or the like may be used. Further, as cells contained in the cultivation container 50, multipotential stem cells such as induced pluripotent stem (iPS) cells and embryonic stem (ES) cells, cells of nerves, the skin, the myocardium and the liver, which are differentiated and induced from a stem cell, cells of the skin, the retina, the myocardium, blood corpuscles, nerves, and organs extracted from a human body, and the like, may be used.

Figure 5:
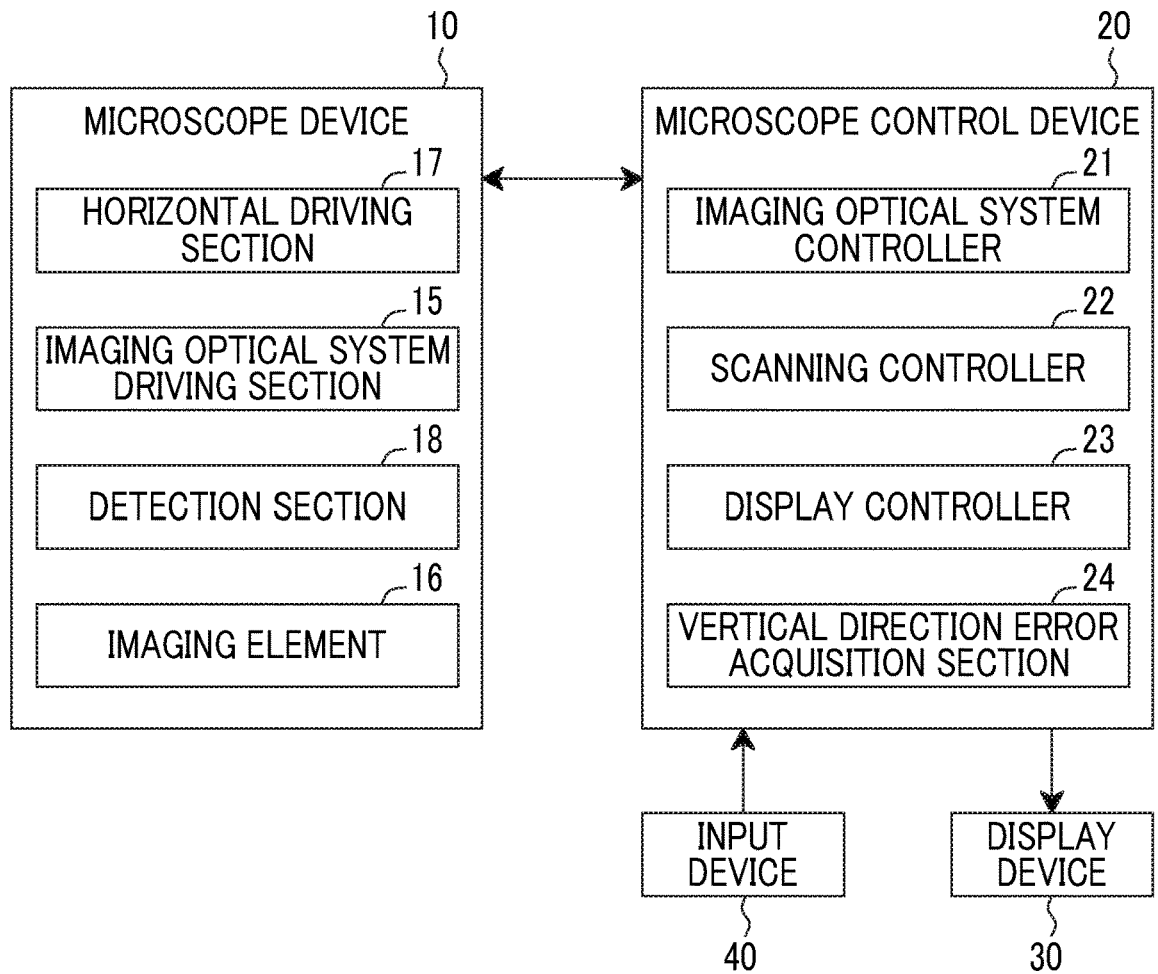
FIG. 5 is a block diagram showing a schematic configuration of the microscope observation system that uses the observation device according to the embodiment of the present invention.

The stage 51 is configured to be moved in an X direction and a Y direction that are orthogonal to each other by a horizontal driving section 17 (see FIG. 5). The X direction and the Y direction are directions that are orthogonal to a Z direction, and are directions that are orthogonal to each other in a horizontal plane, in this embodiment, the X direction is referred to as a main scanning direction, and the Y direction is referred to as a sub-scanning direction.

The slit plate 13 has a configuration in which a ring-shaped slit through which white light passes is formed in a light-shielding plate that shields white light emitted from the white light source 11. As the white light passes through the slit, ring-shaped illumination light L is formed.

Figure 3:
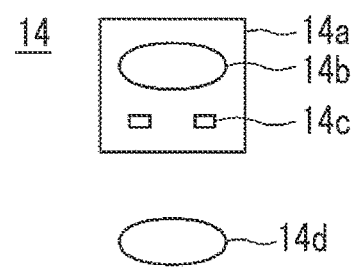
FIG. 3 is a schematic diagram showing a configuration of an imaging optical system.

FIG. 3 is a diagram showing a detailed configuration of the imaging optical system 14. The imaging optical system 14 includes a phase difference lens 14a and an imaging lens 14d, as shown in FIG. 3. The phase difference lens 14a includes an objective lens 14b and a phase plate 14c. The phase plate 14c has a configuration in which a phase ring is formed in a transparent plate that is transparent with respect to a wavelength of the illumination light L. The size of the slit of the above-described slit plate 13 is in a conjugate relation with the phase ring of the phase plate 14c.

The phase ring has a configuration in which a phase membrane that shifts a phase of incident light by ¼ of a wavelength and a dimmer filter that dims incident light are formed in a ring shape. The phase of direct light incident onto the phase ring shifts by ¼ of a wavelength after passing through the phase ring, and its brightness is weakened. On the other hand, most of diffracted light diffracted by an observation target passes through the transparent plate of the phase plate 14c, and its phase and brightness are not changed.

The phase difference lens 14a having the objective lens 14b is moved in an optical axis direction of the objective lens 14h by the imaging optical system driving section 15 shown in FIG. 1. In this embodiment, the objective lens 14b, the optical axis direction, and a Z direction (vertical direction) are the same direction. An auto-focus control is performed as the phase difference lens 14a is moved in the Z direction, and contrast of a phase difference image captured by the imaging element 16 is adjusted.

Further, a configuration in which a magnification of the phase difference lens 14a is changeable may be used. Specifically, a configuration in which the phase difference lenses 14a or the imaging optical systems 14 having different magnifications are interchangeable may be used. The interchange between the phase difference lens 14a and the imaging optical systems 14 may be automatically performed, or may be manually performed by a user.

The imaging optical system driving section 15 includes an actuator such as a piezoelectric element, for example, and performs driving on the basis of a control signal output from an imaging optical system controller 21 (which will be described later). The imaging optical system driving section 15 is configured to pass a phase difference image passed through the phase difference lens 14a as it is. Further, the configuration of the imaging optical system driving section 15 is not limited to the piezoelectric element. A configuration in which the phase difference lens 14a is movable in the Z direction may be used, and known different configurations may be used.

The imaging lens 14d receives a phase difference image passed through the phase difference lens 14a and the imaging optical system driving section 15 and incident thereto, and causes an image based on the phase difference image to be formed on the imaging element 16.

The imaging element 16 captures an image on the basis of the phase difference image formed by the imaging lens 14d, As the imaging element 16, a charge-coupled device (CCD) image sensor, a complementary metal-oxide semiconductor (CMOS) image sensor, or the like may be used. As the imaging element, an imaging element in which color filters of red, green, and blue (R, G, and B) are provided may be used, or a monochromic imaging element may be used.

The detection section 18 detects a Z-directional (vertical) position at each observation position in the cultivation container 50 placed on the stage 51. Specifically, the detection section 18 includes a first auto-focus displacement sensor 18a and a second auto-focus displacement sensor 18b. The first auto-focus displacement sensor 18a and the second auto-focus displacement sensor 18b are provided in parallel in the X direction as shown in FIG. 1 with the imaging optical system 14 (objective lens 14b) being interposed therebetween. The first auto-focus displacement sensor 18a and the second auto-focus displacement sensor 18b in this embodiment are laser displacement meters, which irradiate the cultivation container 50 with laser light and detect its reflection light to detect a Z-directional position of a bottom surface of the cultivation container 50. The bottom surface of the cultivation container 50 refers to a boundary surface between a bottom portion of the cultivation container 50 and cells that are observation targets, that is, a surface on which the observation targets are placed.

Information on the Z-directional position of the cultivation container 50 detected by the detection section 18 is output to the imaging optical system controller 21, and the imaging optical system controller 21 controls the imaging optical system driving section 15 on the basis of the input position information to perform the auto-focus control.

More specifically, in the microscope device 10 according to the embodiment, before an observation region of the imaging optical system 14 reaches each observation position in the cultivation container 50 on the stage 51, information on the Z-directional position of the cultivation container 50 at the observation position is precedently detected by the first or second auto-focus displacement sensor 18a or 18b, and the imaging optical system driving section 15 is controlled on the basis of the position information, to thereby perform the auto-focus control.

Here, as in the embodiment, in a case where an image of an observation target in the cultivation container 50 placed on the stage 51 is observed while moving the stage 51 in the X direction and the Y direction, a Z-directional position of the stage 51 is not constant, but is changed according to the X-directional position of the stage 51, due to mechanical accuracy of the horizontal driving section 17 (which will be described later) for moving the stage 51. That is, a so-called "undulation" occurs in the movement of the stage 51.

Accordingly, as in the embodiment, in a case where the information on the Z-directional position at the observation position of the cultivation container 50 is precedently detected by the first or second auto-focus displacement sensor 18a or 18b and movement of the objective lens 14b in an optical axis direction is to be controlled on the basis of the position information, since the first or second auto-focus displacement sensor 18a or 18b and the objective lens 14b have different X-directional positions with respect to a predetermined observation position in the cultivation container 50, a detection timing of the Z-directional position in the first or second auto-focus displacement sensor 18a or 18b and an observation timing in the objective lens 14b become different from each other.

Figure 4:
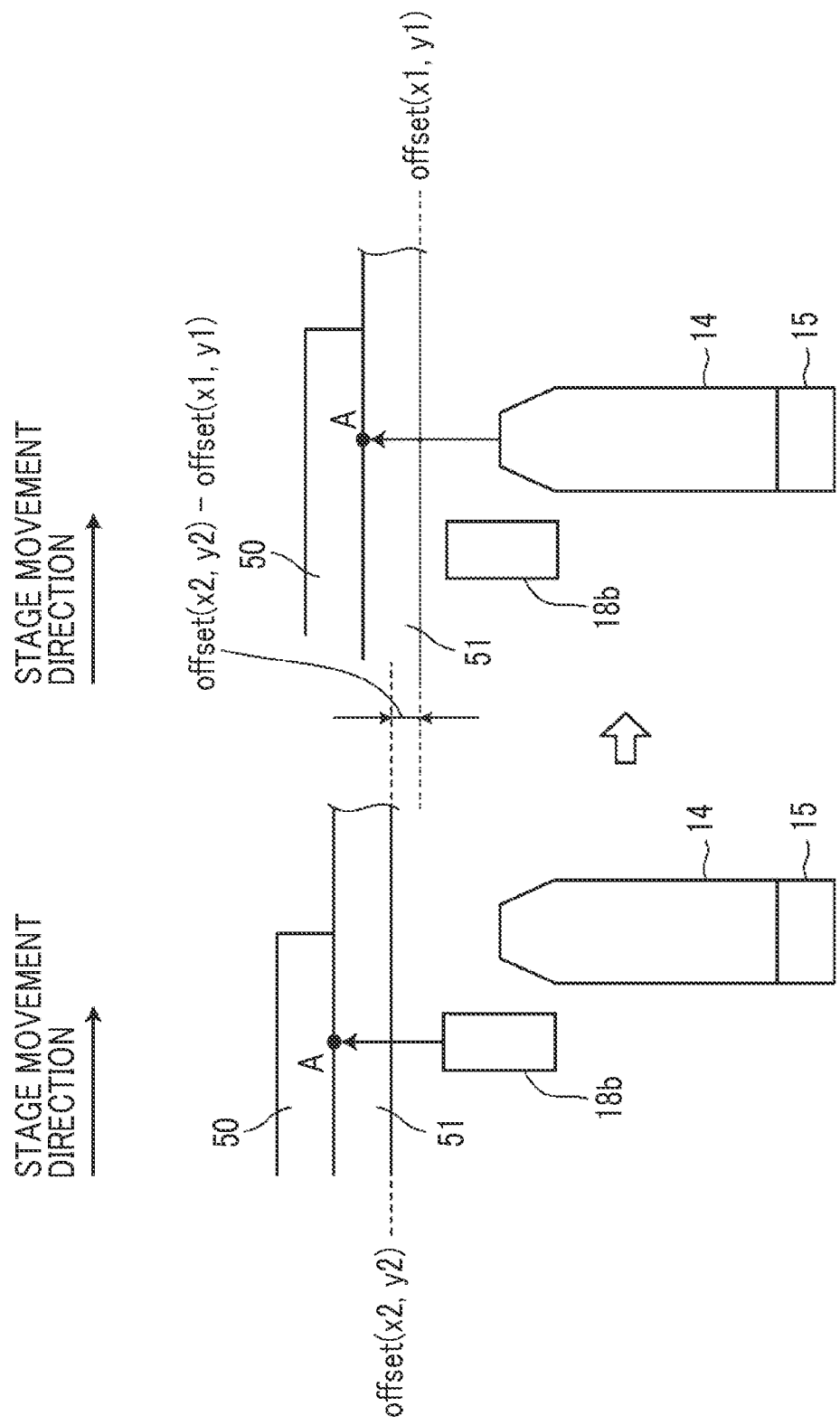
FIG. 4 is a diagram illustrating a position change in a Z direction due to movement of the stage.

Accordingly, for example, as shown in FIG. 4, in a case where with respect to an observation position A in the cultivation container 50, a Z-directional position (offset (x2, y2)) of the stage 51 at a time point when the Z-directional position is detected by the second auto-focus displacement sensor 18b and a Z-directional position (offset (x1, y1)) of the stage 51 at a time point when the observation position A is moved to a position of the observation region of the imaging optical system 14 are different from each other, it is difficult to perform an appropriate auto-focus control.

Thus, in this embodiment, an error (offset (x2, y2)-offset (x1, y1)) between the Z-directional position (offset (x2, y2)) of the stage 51 at the time point when the Z-directional position of the observation position A is detected by the second auto-focus displacement sensor 18b shown in FIG. 4 and the Z-directional position (offset (x1, y1)) of the stage 51 at the time point when the observation region of the imaging optical system 14 is moved to the observation position A is acquired, and the auto-focus control is performed in consideration of the error. The auto-focus control in consideration of the error due to "undulation" of the stage movement will be described in detail later.

Then, a configuration of the microscope control device 20 that controls the microscope device 10 will be described. FIG. 5 is a block diagram showing a configuration of the microscope observation system according to this embodiment. With respect to the microscope device 10, a block diagram of a partial configuration controlled by respective sections of the microscope control device 20 is shown.

The microscope control device 20 generally controls the microscope device 10, and particularly, includes an imaging optical system controller 21, a scanning controller 22, a display controller 23, and a vertical direction error acquisition section 24.

The microscope control device 20 is configured of a computer including a central processing unit, a semiconductor memory, a hard disk, and the like. An embodiment of an observation device control program of the invention is installed in the hard disk. Further, as the observation device control program is executed by the central processing unit, the imaging optical system controller 21, the scanning controller 22, the display controller 23, and the vertical direction error acquisition section 24 shown in FIG. 5 execute their functions.

The imaging optical system controller 21 controls the imaging optical system driving section 15 on the basis of the Z-directional position information of the cultivation container 50 detected by the detection section 18 as described above. Further, the objective lens 14*b* of the imaging optical system 14 is moved in the optical axis direction by driving of the imaging optical system driving section 15, so that the auto-focus control is performed.

The scanning controller 22 controls driving of the horizontal driving section 17, so that the stage 51 is moved in the X direction and the Y direction. The horizontal driving section 17 is configured of an actuator having a piezoelectric element, or the like.

Figure 6:
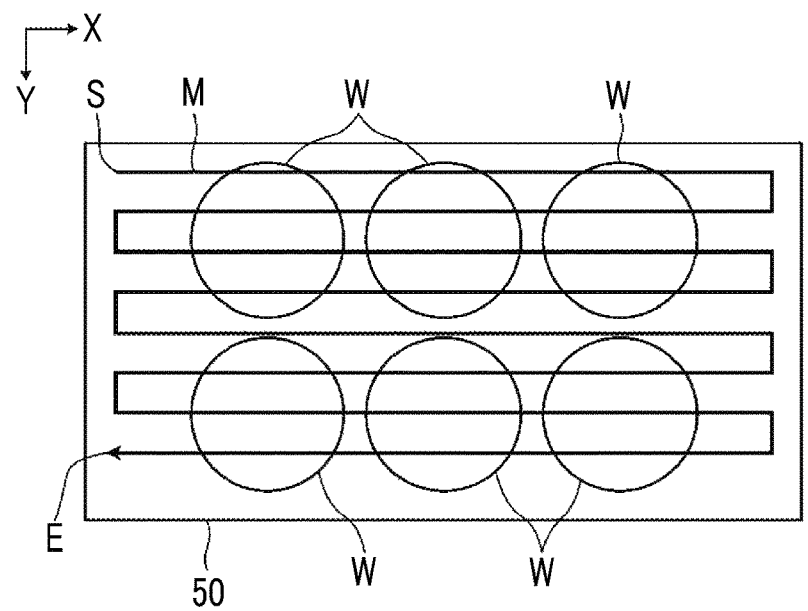
FIG. 6 is a diagram showing a scanning position in an observation region of the imaging optical system in a cultivation container.

In this embodiment, as described above, the stage 51 is moved in the X direction and the Y direction under the control of the main scanning controller the observation region of the imaging optical system 14 is scanned in the cultivation container 50 in a two-dimensional manner, and a phase difference image at each observation position in the cultivation container 50 is captured. FIG. 6 is a diagram showing a scanning position of an observation region in the cultivation container 50 using a solid line M. In this embodiment, a well plate having six wells W is used as the cultivation container 50.

As shown in FIG. 6, the observation region of the imaging optical system 14 is scanned from a scanning start point S to a scanning end point F along the solid line M, by the movement of the stage 51 in the X direction and the Y direction. That is, the observation region of the imaging optical system 14 is scanned in a positive direction (a rightward direction in FIG. 6) of the X direction, is scanned in the Y direction (a downward direction in FIG. 6), and then, is scanned in a reverse negative direction (in a leftward direction in FIG. 6), Then, the observation region of the imaging optical system 14 is scanned in the Y direction again, and then, is scanned in the positive direction of the X direction again. In this way, by repeating the reciprocal scanning in the X direction and the scanning in the Y direction by the movement of the stage 51, the observation region of the imaging optical system 14 is scanned in the cultivation container 50 in a two-dimensional manner.

Figure 7:
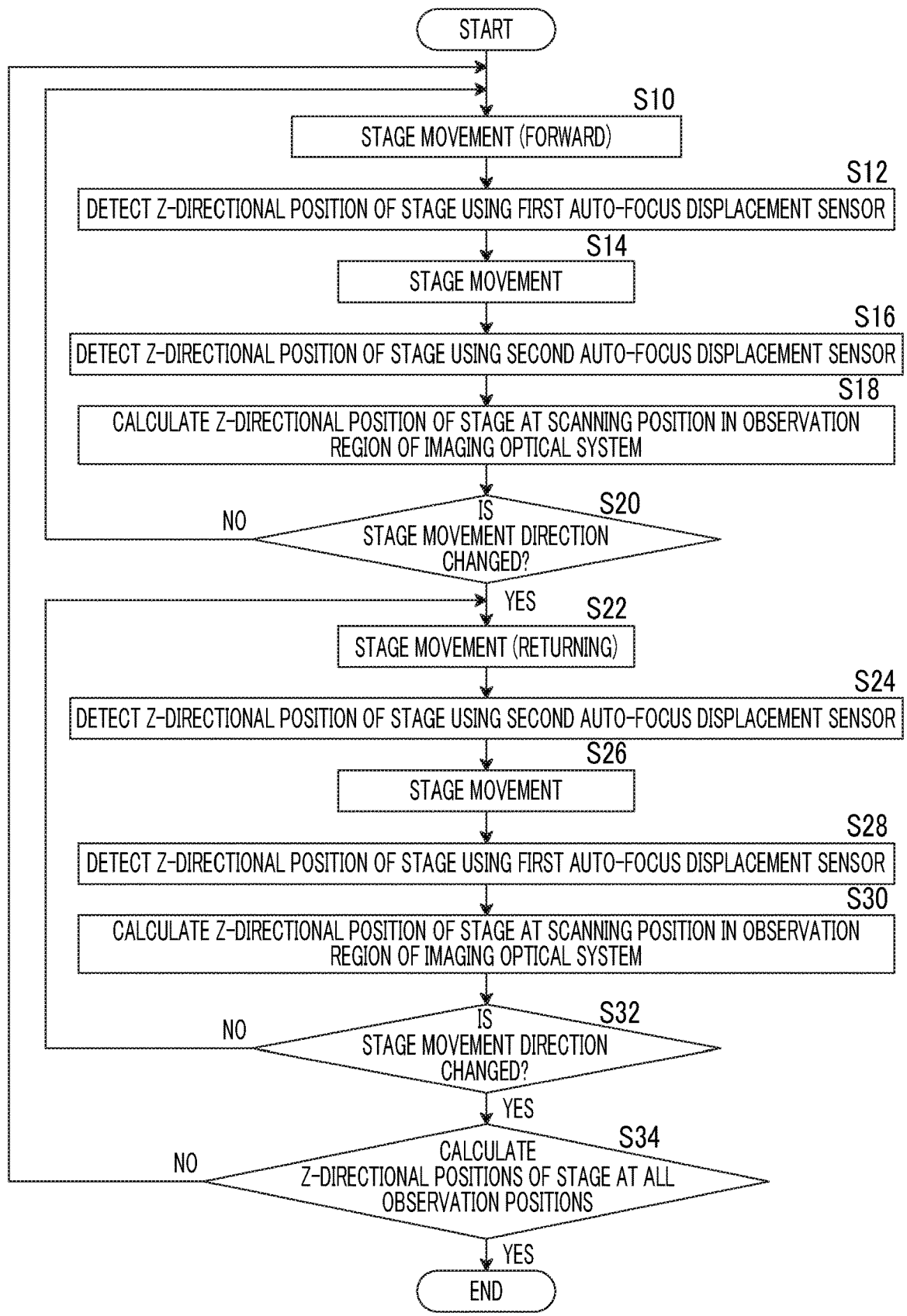
FIG. 7 is a flowchart illustrating a method for acquiring a table in which an error of a Z-directional position of the stage is set.

The vertical direction error acquisition section 24 acquires an error of the Z-directional position that occurs by the above-mentioned "undulation" of the movement of the stage 51. Specifically, in the vertical direction error acquisition section 24, a table in which an error of the Z-directional position of the stage 51 is set in advance with respect to each observation position in the cultivation container 50 placed on the stage 51. The vertical direction error acquisition section 24 acquires the error of the Z-directional position of the stage 51 at each observation position in the cultivation container 50 with reference to the table. Hereinafter, a method for setting the table will be described with reference to a flowchart shown in FIG. 7, and FIGS. 8 and 9.

Figure 8:
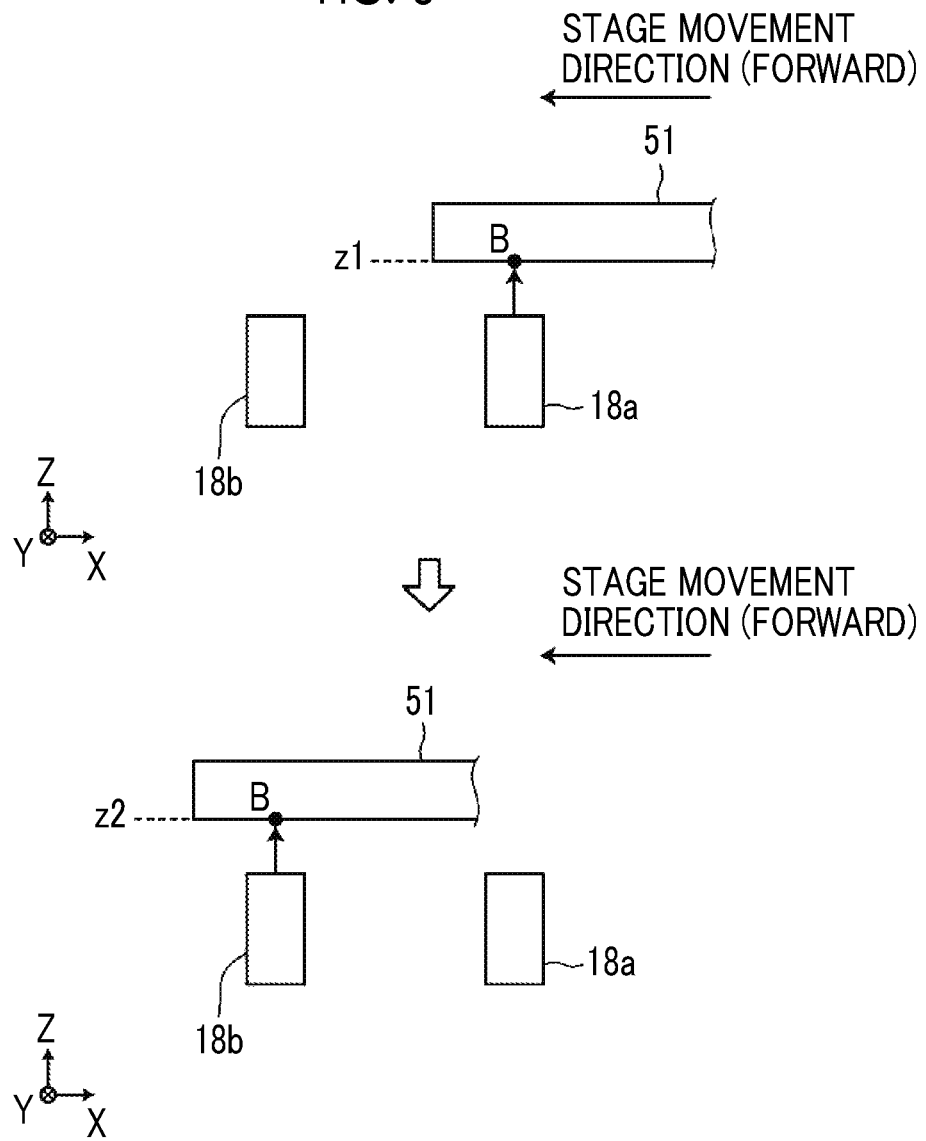
FIG. 8 is a schematic diagram illustrating the method for acquiring the table in which the error of the Z-directional position of the stage is set, in the case that the stage 51 is moved forward.

First, forward movement of the stage 51 is started (S10), and as shown in FIG. 8, a Z-directional position of a predetermined position B of the stage 51 is detected by the first auto-focus displacement sensor 18*a* (S12). The Z-directional position of the stage 51 refers to a position of a bottom surface of the stage 51, in this embodiment.

Then, as shown in FIG. 8, the stage 51 is moved forward (S14), at a time point when the predetermined position B of the stage 51 is moved to the position of the second auto-focus displacement sensor 18*b*, the Z-directional position of the predetermined position B is detected (S16).

Further, on the basis of a Z-directional position z1 of the predetermined position B detected by the first auto-focus displacement sensor 18*a* and a Z-directional position z2 of the predetermined position B detected by the second auto-focus displacement sensor 18*b*, the Z-directional position of the stage 51 at the scanning position in the observation region of the imaging optical system 14 is detected (S18). Specifically, in this embodiment, since the imaging optical system 14 is disposed at a middle position between the first auto-focus displacement sensor 18*a* and the second auto-focus displacement sensor 18*b* in the X direction, an average value of the Z-directional position z1 and the Z-directional position z2 is calculated as a Z-directional position z3 of the stage 51 at the scanning position in the observation region of the imaging optical system 14.

Further, until the forward movement of the stage 51 is terminated (NO in S20), the processes of S10, S12, S14, S16 and S18 are repeated, and the Z-directional position z3 of the stage 51 at each scanning position in the observation region of the imaging optical system 14 is acquired with respect to a forward path.

Figure 9:
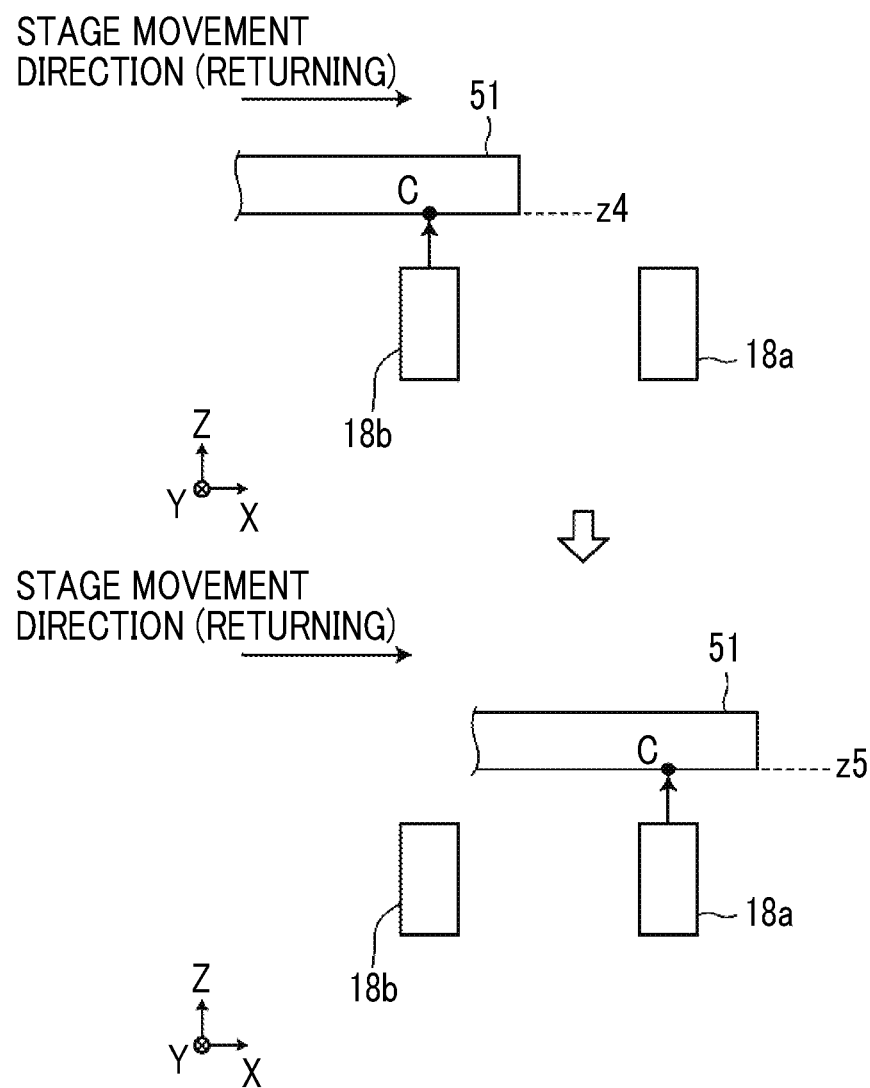
FIG. 9 is a schematic diagram illustrating the method for acquiring the table in which the error of the Z-directional position of the stage is set, in the case that the stage 51 is reversely moved.

Then, in a case where the forward movement of the stage 51 is terminated, and then, the movement of the stage 51 is switched to returning movement (YES in S20, and S22), as shown in FIG. 9, a Z-directional position of a predetermined position C of the stage 51 is detected by the second auto-focus displacement sensor 18*b* (S24).

Then, as shown in FIG. 9, the stage 51 is reversely moved (S26), and at a time point when the predetermined position C of the stage 51 is moved to the position of the first auto-focus displacement sensor 18*a*, the Z-directional position of the predetermined position C is detected (S28).

Further, on the basis of a Z-directional position z4 of the predetermined position C detected by the second auto-focus displacement sensor 18*b* and a Z-directional position z5 of the predetermined position C detected by the first auto-focus displacement sensor 18*a*, a Z-directional position z6 of the stage 51 at the scanning position in the observation region of the imaging optical system 14 is detected (S30). Specifically, similar to the case of the forward movement, an average value of the Z-directional position z4 and the Z-directional position z5 is calculated as the Z-directional position z6 of the stage 51 at the scanning position in the observation region of the imaging optical system 14.

Further, until the returning movement of the stage 51 is terminated (NO in S32), the processes of S24, S26, S28 and S30 are repeated, and the Z-directional position z6 of the stage 51 at each scanning position in the observation region of the imaging optical system 14 is acquired with respect to a returning path.

Then, at a time point when the returning movement of the stage 51 is terminated, in a case where the Z-directional positions of the stage 51 at the entire scanning positions in the observation region are not calculated (YES in S32 and NO in S34), again, the movement of the stage 51 is switched to the forward movement, and the processes of S10, S12, S14, S16, S18, S20, S22, S24, S26, S28, S30 and S32 are repeatedly performed. On the other hand, at the time point when the returning movement of the stage 51 is terminated, in a case where the Z-directional positions of the stage 51 at the entire scanning positions in the observation region are calculated (YES in S34), the procedure is terminated as it is.

Further, with respect to the forward movement, an error of the Z-directional position of the stage 51 is calculated by subtracting the Z-directional position z3 of the stage 51 calculated using the Z-directional position z1 from the Z-directional position z1 of the stage 51 detected by the first auto-focus displacement sensor 18*a*. Similarly, with respect to each observation position in the cultivation container 50, an error of the Z-directional position of the stage 51 is calculated, and is set in the vertical direction error acquisition section 24 as a table.

Further, with respect to the returning movement, an error of the Z-directional position of the stage 51 is calculated by subtracting the Z-directional position z6 of the stage 51 calculated using the Z-directional position z4 from the Z-directional position z4 of the stage 51 detected by the second auto-focus displacement sensor 18b. Similarly, with respect to each observation position in the cultivation container 50, an error of the Z-directional position of the stage 51 is calculated. Further, a table in which each observation position in the cultivation container 50 and the error of the Z-directional position of the stage 51 at each observation position are associated with each other is set in the vertical direction error acquisition section 24.

It is preferable that the table set in the vertical direction error acquisition section 24 is updated at an interval of a predetermined time. Specifically, for example, in a case where imaging such as time lapse imaging is performed plural times in a time-dependent manner, it is preferable to update the table for each imaging. The invention is not limited thereto, and the table may be periodically updated, for example, everyday or every month. By updating the table as described above, it is possible to handle a change due to deterioration of a stage moving mechanism with the lapse of time, for example.

Further, in this embodiment, when the table is acquired, different errors are acquired in a case where the stage 51 is moved forward and in a case where the stage 51 is reversely moved. Since there is a case where the stage 51 shows different position changes in the Z direction between the forward movement and the returning movement, by acquiring different errors between the forward movement and the returning movement as described above, it is possible to perform error measurement with higher accuracy.

Next, returning to FIG. 5, the display controller 23 combines phase difference images at the respective observation positions imaged by the microscope device 10 to generate one synthetic phase difference image, and displays the synthetic phase difference image on the display device 30.

The display device 30 displays the synthetic phase difference image generated by the display controller 23 as described above. For example, the display device 30 includes a liquid crystal display, or the like. Further, the display device 30 may be formed by a touch panel, and may also be used as the input device 40.

The input device 40 includes a mouse, a keyboard, or the like, and receives various setting inputs from a user. The input device 40 according to this embodiment receives a setting input such as a change command of the magnification of the phase difference lens 14a or a change command of the moving velocity of the stage, for example.

Figure 10:
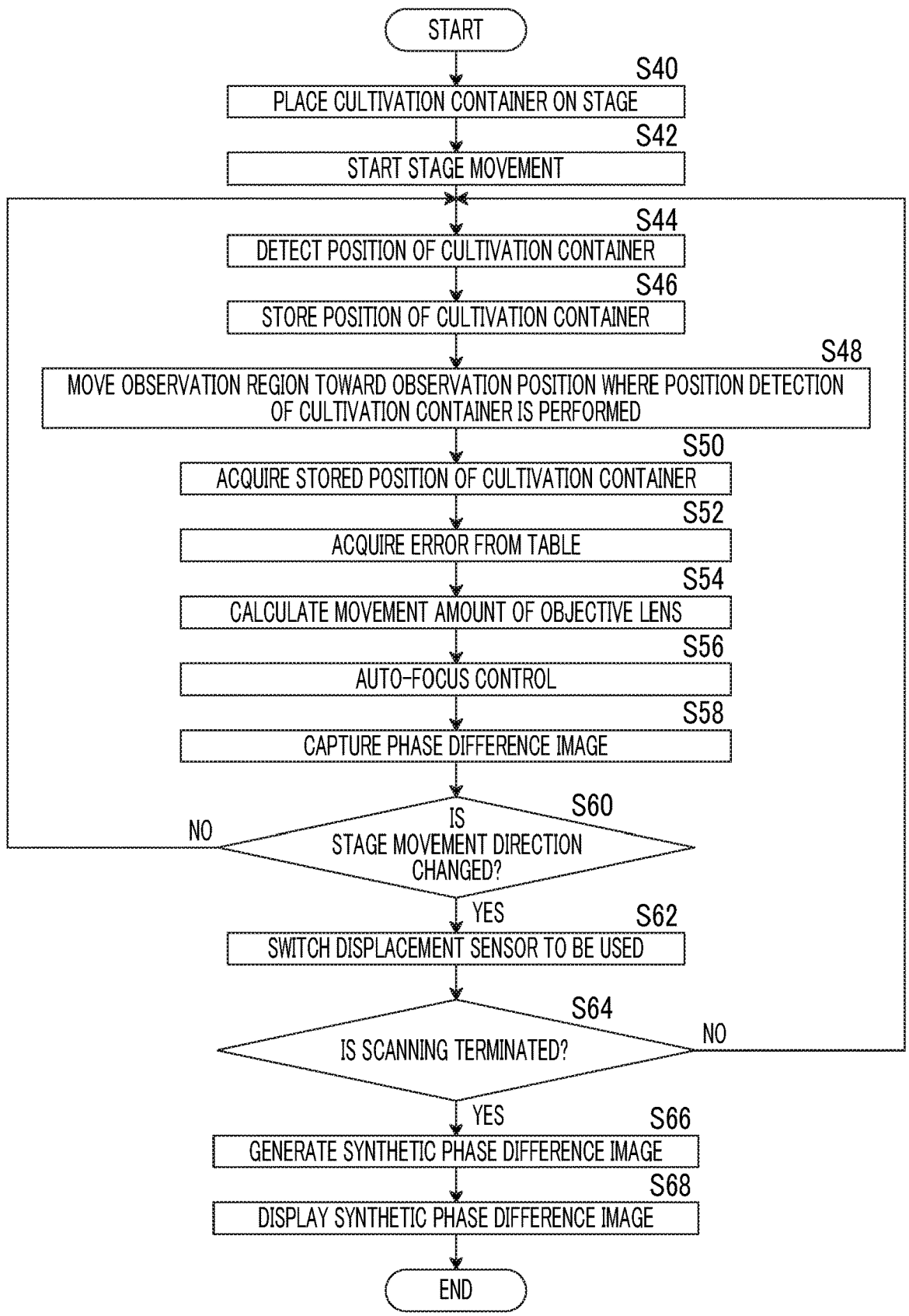
FIG. 10 is a flowchart illustrating an operation of the microscope observation system that uses the observation device according to the embodiment of the invention.

Next, an operation of the microscope observation system according to this embodiment will be described with reference to a flowchart shown in FIG. 10.

First, the cultivation container 50 in which cells that are observation targets are contained is provided on the stage 51 (S40).

Then, movement of the stage 51 is started so that the observation region of the imaging optical system 14 is set at the position of the scanning start point S shown in FIG. 6 through the movement of the stage 51 (S42).

Here, in this embodiment, as described above, the Z-directional position of the cultivation container 50 is precedently detected with respect to each observation position in the cultivation container 50, and at a time point when the observation region of the imaging optical system 14 is scanned up to the observation position, capturing of a phase difference image is performed. Further, the detection of the Z-directional position of the cultivation container 50 and the capturing of the phase difference image are performed while scanning the observation region of the imaging optical system 14, and capturing of a phase difference image at a certain observation position and detection of the Z-directional position of the cultivation container 50 at a forward position in the main scanning direction with reference to the observation position are performed in parallel.

Figure 11:
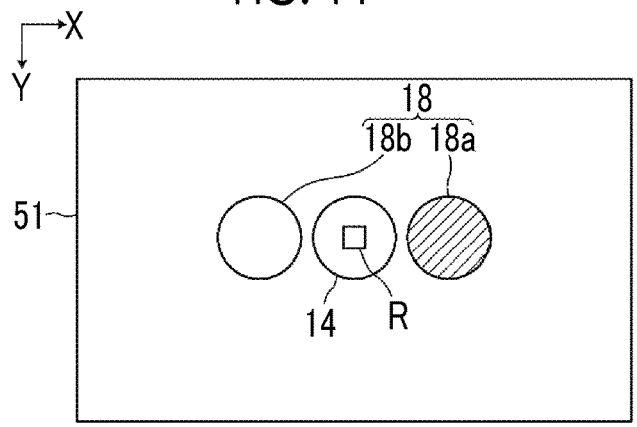
FIG. 11 is a schematic diagram illustrating an operation of the microscope observation system in a case where the stage is moving forward.

Specifically, in a case where the stage 51 is moved forward in an arrow direction shown in FIG. 11, the Z-directional position of the cultivation container 50 is detected by the auto-focus displacement sensor disposed in front of the main scanning direction with reference to the imaging optical system 14, that is, the first auto-focus displacement sensor 18a in this example (S44), and information on the detected position is acquired by the imaging optical system controller 21. The imaging optical system controller 21 stores the acquired information on the Z-directional position of the cultivation container 50 together with X-Y coordinates of the detected position of the cultivation container 50 (S46).

Then, an observation region R of the imaging optical system 14 is moved toward an observation position where the position detection of the cultivation container 50 is performed by the first auto-focus displacement sensor 18a in S44 (S48). Further, the imaging optical system controller 21 reads out the information on the Z-directional position of the cultivation container 50 that is precedently detected by the first auto-focus displacement sensor 18a immediately before the observation region R reaches the observation position where the position detection of the cultivation container 50 is performed (S50). Further, the imaging optical system controller 21 acquires an error of the Z-directional position of the stage 51 at the observation position at a time point when the observation region R is scanned up to the observation position where the position detection of the cultivation container 50 is performed, with reference to the table set in the vertical direction error acquisition section 24 (S52).

Further, the error is subtracted from the information on the Z-directional position of the cultivation container 50 detected by the first auto-focus displacement sensor 18a, and a movement amount in the Z direction of the objective lens 14b of the imaging optical system 14 is calculated on the basis of a value of the subtraction result (S54). Then, an auto-focus control is performed on the basis of the movement amount (S56).

Further, after the auto-focus control, at a time point when the observation region R reaches the observation position where the position detection of the cultivation container 50 is performed, capturing of a phase difference image is performed (S58). The phase difference image is output from the imaging element 16 to the display controller 23 for storage. As described above, while the capturing of the phase difference image at each observation position is being performed in S58, the detection of the Z-directional position of the cultivation container 50 is performed in parallel at a forward position in the scanning direction with reference to the observation position.

Figure 12:
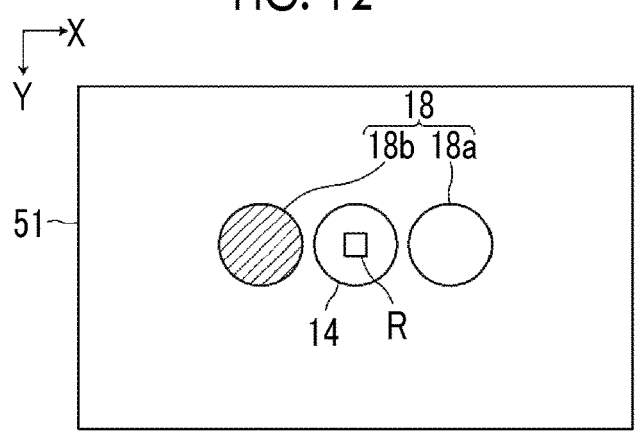
FIG. 12 is a schematic diagram illustrating another operation of the microscope observation system in a case where the stage is reversely moving.

Further, in a case where the forward movement is terminated, and then, the movement is switched to a returning movement as shown in FIG. 12 (S60, YES), a displacement sensor to be used is switched from the first auto-focus displacement sensor 18a to the second auto-focus displacement sensor 18b (S62).

In addition, in a case where the entire scanning is not terminated at this time point (S64, NO), the stage 51 is reversely moved again, and the processes of S44, S46, S48, S50, S52, S54, S56 and S58 are performed.

The displacement sensor to be used is switched whenever the movement direction of the stage 51 is changed, and the processes of S44, S46, S48, S50, S52, S54, S56, S58, S60 and S62 are repeatedly performed until the entire scanning is terminated. Further, at a time point when the observation region R reaches the position of the scanning end point E shown in FIG. 6, the entire scanning is terminated (S64, YES).

After the entire scanning is terminated, the display controller 23 combines phase difference images in the respective observation regions R to generate a synthetic phase difference image (S66), and displays the generated synthetic phase difference image on the display device 30 (S68).

According to the microscope observation system of this embodiment, since the error between the vertical position of the stage 51 at the time point when the vertical position of the cultivation container 50 at each observation position is precedently detected by the first or second auto-focus displacement sensor 18a or 18b and the vertical position of the stage 51 at the time point when the observation region of the imaging optical system 14 is scanned up to each observation position is acquired, and the objective lens 14b is moved in the optical axis direction on the basis of the acquired error and the vertical position of the cultivation container 50 detected by the first or second auto-focus displacement sensor 18a or 18b, it is possible to perform the auto-focus control with high accuracy without being affected by a vertical position change due to the movement of the stage 51.

In the microscope observation system of this embodiment, the Z-directional positions of the stage 51 are detected using the first and second auto-focus displacement sensors 18a and 18b, but the invention is not limited thereto, and stage position measurement displacement sensors other than the first and second auto-focus displacement sensors 18a and 18b may be provided.

Figure 13:
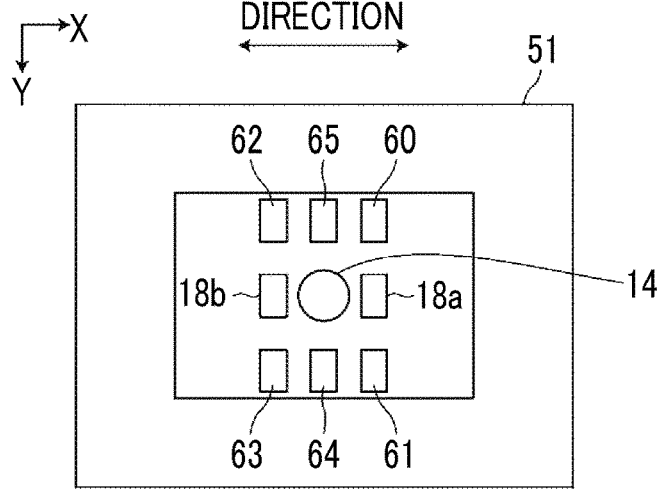
FIG. 13 is a schematic diagram showing an observation device according to another embodiment of the invention.

FIG. 13 shows an example in which stage position measurement displacement sensors 60 to 65 are provided. The stage position measurement displacement sensors 60 to 63 correspond to first stage position measurement displacement sensors of the invention, and the stage position measurement displacement sensors 64 and 65 correspond to second stage position measurement displacement sensors of the invention, Specifically, the stage position measurement displacement sensors 60 and 61 are disposed at the same position as that of the first auto-focus displacement sensor 18a in the X direction, and are arranged in parallel in the Y direction with the first auto-focus displacement sensor being interposed therebetween. Further, the stage position measurement displacement sensors 62 and 63 are disposed at the same position as that of the second auto-focus displacement sensor 18b in the X direction, and are arranged in parallel in the Y direction with the second auto-focus displacement sensor 18h being interposed therebetween. In addition, the stage position measurement displacement sensors 64 and 65 are disposed at the same position as that of the imaging optical system 14 in the X direction, and are arranged in parallel in the Y direction with the imaging optical system 14 being interposed therebetween. It is preferable that the stage position measurement displacement sensors 60 to 65 are laser displacement sensors.

In the above-described embodiment, the Z-directional position of the stage 51 at the scanning position in the observation region of the imaging optical system 14 is calculated on the basis of the Z-directional position of the stage 51 detected by the first auto-focus displacement sensor 18a and the Z-directional position of the stage 51 detected by the second auto-focus displacement sensor 18b, but since the first and second auto-focus displacement sensors 18a and 18h and the imaging optical system 14 have different X-directional positions, the Z-directional position of the stage 51 at the scanning position in the observation region of the imaging optical system 14 is not constantly accurate.

On the other hand, in the embodiment shown in FIG. 13, since the stage position measurement displacement sensors 64 and 65 are arranged at the same position as that of the imaging optical system 14 in the X direction, it is possible to calculate a Z-directional position change due to the movement of the stage 51 in the X direction with high accuracy compared with the above-described embodiment. Here, the configuration of the above-described embodiment is preferable in terms of cost reduction.

In the embodiment shown in FIG. 13, instead of detecting the Z-directional position of the stage 51 by the first auto-focus displacement sensor 18a, the Z-directional position of the stage 51 at the position of the first auto-focus displacement sensor 18a is acquired using the stage position measurement displacement sensors 60 and 61. Specifically, by calculating an average value of a Z-directional position Z60 of the stage 51 detected by the stage position measurement displacement sensor 60 and a Z-directional position Z61 of the stage 51 detected by the stage position measurement displacement sensor 61, a Z-directional position Z70 of the stage 51 at the position of the first auto-focus displacement sensor 18a is calculated.

Further, instead of detecting the Z-directional position of the stage 51 by the second auto-focus displacement sensor 18b, the Z-directional position of the stage 51 at the position of the second auto-focus displacement sensor 18b is acquired using the stage position measurement displacement sensors 62 and 63. Specifically, by calculating an average value of a Z-directional position Z62 of the stage 51 detected by the stage position measurement displacement sensor 62 and a Z-directional position Z63 of the stage 51 detected by the stage position measurement displacement sensor 63, a Z-directional position Z80 of the stage 51 at the position of the second auto-focus displacement sensor 18b is calculated.

Further, in the embodiment shown in FIG. 13, the Z-directional position of the stage 51 at the scanning position in the observation region of the imaging optical system 14 is acquired using the stage position measurement displacement sensors 64 and 65. Specifically, by calculating an average value of a Z-directional position Z64 of the stage 51 detected by the stage position measurement displacement sensor 64 and a Z-directional position Z65 of the stage 51 detected by the stage position measurement displacement sensor 65, a Z-directional position Z90 of the stage 51 at the scanning position in the observation region of the imaging optical system 14 is calculated.

Further, in the embodiment shown in FIG. 13, in the case of the forward movement, by subtracting the position Z90 from the Z-directional position Z70 of the stage 51, the above-described error of the Z-directional position of the stage 51 is calculated. Further, in the case of the returning movement, by subtracting the position Z90 from the Z-directional position Z80 of the stage 51, the above-described error of the Z-directional position of the stage 51 is calculated.

In the embodiment shown in FIG. 13, six stage position measurement displacement sensors 60 to 65 are provided, but all of them may not be provided. For example, only the stage position measurement displacement sensors 64 and 65 among the six displacement sensors may be provided. In this case, the Z-directional positions of the stage 51 at the positions of the first and second auto-focus displacement sensors 18a and 18b are detected using the first and second auto-focus displacement sensors 18a and 18b.

Further, in the above-described embodiments, the invention is applied to a phase difference microscope, but the invention is not limited to the phase difference microscope, and may be applied to a different microscope such as a differential interference microscope or a bright field microscope.

In addition, in the above-described embodiments, a configuration in which a phase difference image formed by the imaging optical system 14 is captured by the imaging element 16 is shown, but a configuration in which an imaging element is not provided and an observation optical system or the like is provided so that a user is able to directly observe a phase difference image of an observation target formed by the imaging optical system 14 may be used.

EXPLANATION OF REFERENCES

10: microscope device
11: white light source
12: condenser lens
13: slit plate
14: imaging optical system
14a: phase difference lens
14b: objective lens
14c: phase plate
14d: imaging lens
15: imaging optical system driving section
16: imaging element
17: horizontal driving section
18: detection section
18a: first auto-focus displacement sensor
18b: second auto-focus displacement sensor
20: microscope control device
21: imaging optical system controller
22: scanning controller
23: display controller
24: vertical direction error acquisition section
30: display device
40: input device
50: cultivation container
51: stage
51a: opening
L: illumination light
R: observation region
W: well

What is claimed is:

1. An observation device comprising:
a stage on which a container in which an observation target is contained is placed;
an imaging optical lens system that includes an objective lens for forming an image of the observation target;
an imaging optical system driving actuator that moves the objective lens along an optical axis;
a horizontal driving actuator that moves the stage in a horizontal plane;
a scanning controller that controls the horizontal driving actuator to move the stage in a main scanning direction in the horizontal plane and in a sub-scanning direction orthogonal to the main scanning direction, to scan each observation position in the container in an observation region of the imaging optical lens system;
a detector that includes at least one of a plurality of auto-focus displacement sensors that precedently detect a vertical position of the container at an observation position before the observation region reaches the observation position in the container, through scanning in the main scanning direction in the observation region of the imaging optical lens system;
two first stage position measurement displacement sensors that are provided in parallel in the sub-scanning direction with the at least one of a plurality of auto-focus displacement sensors being interposed therebetween at the same position as the position of the at least one of a plurality of auto-focus displacement sensors in the main scanning direction;
an imaging optical system controller that controls an operation of the imaging optical system driving actuator at a time point the observation position is scanned in the observation region of the imaging optical lens system, on a basis of the vertical position of the container detected by the detector; and
a vertical direction error acquisition processor that acquires an error between a vertical position of the stage at a time point the vertical position of the container is precedently detected at the observation position by the at least one of a plurality of auto-focus displacement sensors and a vertical position of the stage at a time point the observation region of the imaging optical lens system is scanned up to the observation position,
wherein the vertical direction error acquisition processor acquires the vertical position of the stage at the position of the at least one of a plurality of auto-focus displacement sensors, on a basis of vertical positions of the stage detected by the two first stage position measurement displacement sensors,
wherein the imaging optical system controller controls the operation of the imaging optical system driving actuator to move the objective lens along the optical axis on the basis of the vertical position of the container at the observation position that is precedently detected by the at least one of a plurality of auto-focus displacement sensors and the error acquired by the vertical direction error acquisition processor, in scanning the observation position in the observation region of the imaging optical lens system.

2. The observation device according to claim 1, wherein the horizontal driving actuator moves the stage in the sub-scanning direction orthogonal to the main scanning direction while reciprocally moving the stage in the main scanning direction, and
wherein the vertical direction error acquisition processor acquires different errors between a case where the stage is moved forward and a case where the stage is reversely moved.

3. The observation device according to claim 2, wherein the detector includes at least two auto-focus displacement sensors that are provided in parallel in the main scanning direction with the objective lens being interposed therebetween, and
wherein the vertical direction error acquisition processor acquires the vertical position of the stage at a scanning position in the observation region of the imaging optical lens system, on a basis of vertical positions of the stage detected by the at least two auto-focus displacement sensors.

4. The observation device according to claim 3,
wherein the vertical direction error acquisition processor includes a table in which each observation position in the container and the error at each observation position are associated with each other.

5. The observation device according to claim 2, further comprising:
two second stage position measurement displacement sensors that are provided in parallel in the sub-scanning direction with the imaging optical lens system being interposed therebetween at the same position as the position of the imaging optical lens system in the main scanning direction,
wherein the vertical direction error acquisition processor acquires a vertical position of the stage at a scanning position in the observation region of the imaging optical lens system, on a basis of vertical positions of the stage detected by the two second stage position measurement displacement sensors.

6. The observation device according to claim 2,
wherein the vertical direction error acquisition processor includes a table in which each observation position in the container and the error at each observation position are associated with each other.

7. The observation device according to claim 1,
wherein the detector includes at least two auto-focus displacement sensors that are provided in parallel in the main scanning direction with the objective lens being interposed therebetween, and
wherein the vertical direction error acquisition processor acquires the vertical position of the stage at a scanning position in the observation region of the imaging optical lens system, on a basis of vertical positions of the stage detected by the at least two auto-focus displacement sensors.

8. The observation device according to claim 7,
wherein the vertical direction error acquisition processor includes a table in which each observation position in the container and the error at each observation position are associated with each other.

9. The observation device according to claim 1, further comprising:
two second stage position measurement displacement sensors that are provided in parallel in the sub-scanning direction with the imaging optical lens system being interposed therebetween at the same position as the position of the imaging optical lens system in the main scanning direction,
wherein the vertical direction error acquisition processor acquires a vertical position of the stage at a scanning position in the observation region of the imaging optical lens system, on a basis of vertical positions of the stage detected by the two second stage position measurement displacement sensors.

10. The observation device according to claim 1,
wherein the vertical direction error acquisition processor includes a table in which each observation position in the container and the error at each observation position are associated with each other.

11. The observation device according to claim 10,
wherein the table is updated at an interval of a predetermined time.

12. The observation device according to claim 1,
wherein the imaging optical system driving actuator includes a piezoelectric element, and moves the objective lens along the optical axis using the piezoelectric element.

13. The observation device according to claim 1,
wherein the at least one of a plurality of auto-focus displacement sensors is a laser displacement sensor.

14. A non-transitory computer readable recording medium storing an observation device control program that causes a computer to execute, with respect to the observation device according to claim 1:
a step of moving a stage on which a container in which an observation target is contained is placed in a main scanning direction and in a sub-scanning direction that is orthogonal to the main scanning direction with respect to an imaging optical lens system including an objective lens for forming an image of the observation target, to scan each observation position in the container in an observation region of the imaging optical lens system;
a step of detecting a vertical position of the container at the observation position by at least one of a plurality of auto-focus displacement sensors before the observation region reaches the observation position in the container, through scanning in the main scanning direction in the observation region of the imaging optical lens system;
a step of acquiring the vertical position of the stage at the position of the at least one of a plurality of auto-focus displacement sensors by two first stage position measurement displacement sensors, on the basis of vertical positions of the stage detected by the two first stage position measurement displacement sensors;
a step of controlling movement of the objective lens along an optical axis at a time point the observation position is scanned in the observation region of the imaging optical lens system, on a basis of the detected vertical position of the container;
a step of acquiring an error between a vertical position of the stage at the observation position detected by the at least one of a plurality of auto-focus displacement sensors and a vertical position of the stage at a time point the observation region of the imaging optical lens system is scanned up to the observation position; and
a step of moving the objective lens along the optical axis, on the basis of the acquired error, and the vertical position of the container at the observation position that is precedently detected by the at least one of a plurality of auto-focus displacement sensors in scanning the observation position in the observation region of the imaging optical lens system.

15. An observation method for moving a stage on which a container in which an observation target is contained is placed in a main scanning direction and in a sub-scanning direction that is orthogonal to the main scanning direction with respect to an imaging optical lens system including an objective lens for forming an image of the observation target, to scan each observation position in the container in each observation region of the imaging optical lens system, precedently detecting a vertical position of the container at the observation position by an auto-focus displacement sensor before the observation region reaches the observation position in the container, through scanning in the main scanning direction in the observation region of the imaging optical lens system, and controlling movement of the objective lens along an optical axis at a time point the observation position is scanned in the observation region of the imaging optical lens system, on a basis of the detected vertical position of the container, comprising:
acquiring an error between a vertical position of the stage at the observation position that is precedently detected by the auto-focus displacement sensor and a vertical position of the stage at a time point the observation region of the imaging optical lens system is scanned up to the observation position;

acquiring the vertical position of the stage at the position of the auto-focus displacement sensor by two first stage position measurement displacement sensors, which are provided in parallel in the sub-scanning direction with the auto-focus displacement sensor being interposed therebetween at the same position as the position of the auto-focus displacement sensor in the main scanning direction, on the basis of vertical positions of the stage detected by the two first stage position measurement displacement sensors; and moving the objective lens along the optical axis, on the basis of the acquired error, and the vertical position of the container at the observation position that is precedently detected by the auto-focus displacement sensor in scanning the observation position in the observation region of the imaging optical lens system.

16. An observation device comprising:
a stage on which a container in which an observation target is contained is placed;
an imaging optical lens system that includes an objective lens for forming an image of the observation target;
an imaging optical system driving actuator that moves the objective lens along an optical axis;
a horizontal driving actuator that moves the stage in a horizontal plane;
a scanning controller that controls the horizontal driving actuator to move the stage in a main scanning direction in the horizontal plane and in a sub-scanning direction orthogonal to the main scanning direction, to scan each observation position in the container in an observation region of the imaging optical lens system;
a detector that includes at least one of a plurality of auto-focus displacement sensors that precedently detect a vertical position of the container at an observation position before the observation region reaches the observation position in the container, through scanning in the main scanning direction in the observation region of the imaging optical lens system;
an imaging optical system controller that controls an operation of the imaging optical system driving actuator at a time point the observation position is scanned in the observation region of the imaging optical lens system, on a basis of the vertical position of the container detected by the detector;
a vertical direction error acquisition processor that acquires an error between a vertical position of the stage at a time point the vertical position of the container is precedently detected at the observation position by the at least one of a plurality of auto-focus displacement sensors and a vertical position of the stage at a time point the observation region of the imaging optical lens system is scanned up to the observation position; and
two second stage position measurement displacement sensors that are provided in parallel in the sub-scanning direction with the imaging optical lens system being interposed therebetween at the same position as the position of the imaging optical lens system in the main scanning direction,
wherein the imaging optical system controller controls the operation of the imaging optical system driving actuator to move the objective lens along the optical axis on the basis of the vertical position of the container at the observation position that is precedently detected by the at least one of a plurality of auto-focus displacement sensors and the error acquired by the vertical direction error acquisition processor, in scanning the observation position in the observation region of the imaging optical lens system,
wherein the vertical direction error acquisition processor acquires a vertical position of the stage at a scanning position in the observation region of the imaging optical lens system, on a basis of vertical positions of the stage detected by the two second stage position measurement displacement sensors.

17. The observation device according to claim 16,
wherein the horizontal driving actuator moves the stage in the sub-scanning direction orthogonal to the main scanning direction while reciprocally moving the stage in the main scanning direction, and
wherein the vertical direction error acquisition processor acquires different errors between a case where the stage is moved forward and a case where the stage is reversely moved.

18. The observation device according to claim 17,
wherein the detector includes at least two auto-focus displacement sensors that are provided in parallel in the main scanning direction with the objective lens being interposed therebetween, and
wherein the vertical direction error acquisition processor acquires the vertical position of the stage at a scanning position in the observation region of the imaging optical lens system, on a basis of vertical positions of the stage detected by the at least two auto-focus displacement sensors.

19. The observation device according to claim 18,
wherein the vertical direction error acquisition processor includes a table in which each observation position in the container and the error at each observation position are associated with each other.

20. The observation device according to claim 17,
wherein the vertical direction error acquisition processor includes a table in which each observation position in the container and the error at each observation position are associated with each other.

21. The observation device according to claim 16,
wherein the detector includes at least two auto-focus displacement sensors that are provided in parallel in the main scanning direction with the objective lens being interposed therebetween, and
wherein the vertical direction error acquisition processor acquires the vertical position of the stage at a scanning position in the observation region of the imaging optical lens system, on a basis of vertical positions of the stage detected by the at least two auto-focus displacement sensors.

22. The observation device according to claim 21,
wherein the vertical direction error acquisition processor includes a table in which each observation position in the container and the error at each observation position are associated with each other.

23. The observation device according to claim 16,
wherein the vertical direction error acquisition processor includes a table in which each observation position in the container and the error at each observation position are associated with each other.

24. The observation device according to claim 23,
wherein the table is updated at an interval of a predetermined time.

25. The observation device according to claim 16, wherein the imaging optical system driving actuator includes a piezoelectric element, and moves the objective lens along the optical axis using the piezoelectric element.

26. The observation device according to claim 16, wherein the at least one of a plurality of auto-focus displacement sensors is a laser displacement sensor.

* * * * *